US 6,618,763 B1

(12) United States Patent
Steinberg

(10) Patent No.: US 6,618,763 B1
(45) Date of Patent: Sep. 9, 2003

(54) VIRTUAL PRIVATE WIRELESS NETWORK IMPLEMENTING MESSAGE DELIVERY PREFERENCES OF THE USER

(75) Inventor: David A. Steinberg, Washington, DC (US)

(73) Assignee: Inphonic Inc., Washington, DC (US)

(*) Notice: Subject to any disclaimer, the term of this patent is extended or adjusted under 35 U.S.C. 154(b) by 0 days.

(21) Appl. No.: 09/777,046

(22) Filed: Feb. 5, 2001

Related U.S. Application Data
(60) Provisional application No. 60/180,255, filed on Feb. 4, 2000.

(51) Int. Cl.[7] .......................... G06F 15/16; H04H 1/00; H04M 11/00
(52) U.S. Cl. .................. 709/246; 455/3.01; 455/412; 455/552; 379/93.24; 379/100.08
(58) Field of Search .......................... 709/246, 232; 379/67, 89, 93.24, 100.08; 455/3.01, 412, 557

(56) References Cited

U.S. PATENT DOCUMENTS

| | | | | |
|---|---|---|---|---|
| 5,325,419 A | * | 6/1994 | Connolly et al. | 455/435 |
| 5,479,411 A | * | 12/1995 | Klein | 379/88.13 |
| 5,506,887 A | * | 4/1996 | Emery et al. | 455/461 |
| 5,594,740 A | * | 1/1997 | LaDue | 455/410 |
| 5,604,788 A | * | 2/1997 | Tett | 455/412 |
| 5,635,918 A | * | 6/1997 | Tett | 340/7.29 |
| 5,724,407 A | * | 3/1998 | Bruno et al. | 379/88.13 |
| 5,742,668 A | * | 4/1998 | Pepe et al. | 455/415 |
| 5,742,905 A | * | 4/1998 | Pepe et al. | 455/461 |
| 5,758,088 A | * | 5/1998 | Bezaire et al. | 709/232 |
| 5,845,203 A | * | 12/1998 | LaDue | 455/414 |
| 5,872,926 A | * | 2/1999 | Levac et al. | 709/206 |
| 5,951,638 A | * | 9/1999 | Hoss et al. | 709/206 |
| 5,959,543 A | * | 9/1999 | LaPorta et al. | 340/7.23 |
| 5,987,100 A | * | 11/1999 | Fortman et al. | 379/88.14 |
| 6,002,750 A | * | 12/1999 | Ertz | 379/88.12 |
| 6,061,718 A | * | 5/2000 | Nelson | 709/206 |
| 6,072,862 A | * | 6/2000 | Srinivasan | 379/100.08 |
| 6,073,029 A | * | 6/2000 | Smith et al. | 455/555 |
| 6,178,331 B1 | * | 1/2001 | Holmes et al. | 455/466 |
| 6,203,192 B1 | * | 3/2001 | Fortman | 379/88.14 |
| 6,237,041 B1 | * | 5/2001 | H.ang..ang.l et al. | 709/246 |
| 6,240,296 B1 | * | 5/2001 | Yu et al. | 455/466 |
| 6,249,808 B1 | * | 6/2001 | Seshadri | 709/206 |
| 6,259,791 B1 | * | 7/2001 | Moore | 380/271 |
| 6,301,245 B1 | * | 10/2001 | Luzeski et al. | 370/352 |
| 6,304,564 B1 | * | 10/2001 | Monin et al. | 370/338 |
| 6,332,085 B1 | * | 12/2001 | Hanson et al. | 455/557 |
| 6,333,973 B1 | * | 12/2001 | Smith et al. | 379/88.12 |
| 6,335,927 B1 | * | 1/2002 | Elliott et al. | 370/352 |
| 6,335,963 B1 | * | 1/2002 | Bosco | 379/88.12 |
| 6,347,340 B1 | * | 2/2002 | Coelho et al. | 709/246 |
| 6,421,707 B1 | * | 7/2002 | Miller et al. | 709/206 |
| 2001/0012339 A1 | * | 8/2001 | Frazier et al. | |

* cited by examiner

*Primary Examiner*—Krisna Lim
(74) *Attorney, Agent, or Firm*—Piper Rudnick

(57) ABSTRACT

A virtual private wireless network in which wireless devices according to the present invention includes at least one wireless device having a screen for displaying received text and an intelligent information interconnect device integrating voice messaging, email, and fax services into a single access point.

The information interconnect device includes a centralized directory database storing identifying information regarding the wireless devices, and further storing delivery preference hierarchy information for delivering content to the wireless devices. A user interface is provided for specifying criteria used to select at least one device ID from the centralized database, and a message delivery system is provided for searching the centralized database using the specified criteria and transmitting information to the wireless device(s) using the delivery preference hierarchy information.

19 Claims, 5 Drawing Sheets

FIG. 3C

Advertising Group

| User 1 |
|---|

| User 2 |
|---|

| User 3 |
|---|

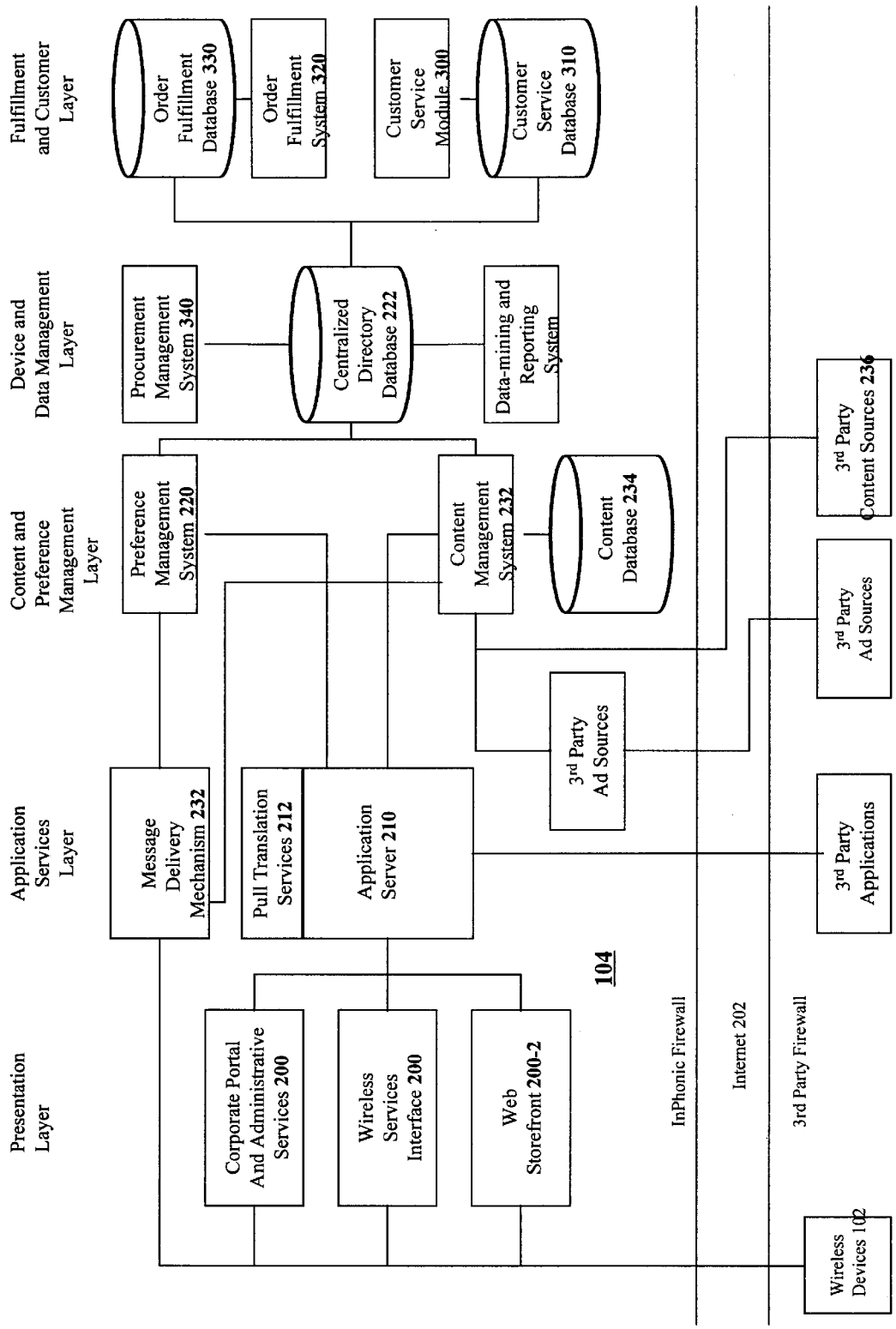
FIG. 4 Virtual Private Wireless Network

US 6,618,763 B1

VIRTUAL PRIVATE WIRELESS NETWORK IMPLEMENTING MESSAGE DELIVERY PREFERENCES OF THE USER

PRIORITY

This application claims priority from provisional application serial No. 60/180,255 entitled "METHOD OF SELLING PRODUCTS FROM THIRD-PARTY SITES" filed Feb. 4, 2000.

RELATED APPLICATION

The present application is related to and fully incorporates by reference to application Ser. No. 60/180,255, filed Feb. 4, 2000, Entitled "METHOD OF SELLING PRODUCTS FROM THIRD-PARTY SITES".

FIELD OF THE INVENTION

The present invention relates to a virtual network of wireless devices capable providing transparent data transmission services. More particularly, the virtual private network of the present invention provides an integrated communications solution for users of wireless devices and to the companies that issue such devices to their employees.

BACKGROUND OF THE INVENTION

The use and proliferation of wireless devices has gown markedly. Such devices provide the user with numerous delivery options. A user may receive voice messages using cell phone or voice mail, or text messages using paging devices or email. In fact, wireless devices are increasingly providing the user with multiple delivery option in a single package. Many cell phones and personal digital assistants (PDA's) provide both telephone and email (Internet) capabilities. A single wireless device may soon service all of a user's communication needs.

Many business enterprises issue wireless communications devices to their employees. However, no facility presently exists for integrating voice messaging, email, and fax services into a single access point. Moreover, no facility exists whereby a user can specify delivery preferences in a manner which is transparent to the sender.

Conventional networks including local area networks, and the internet, are not optimized to provide content in a format compatible with wireless devices.

Accordingly, a first object of the present invention is to provide a network optimized for the needs of wireless devices.

A further object of the present invention is to provide a wireless network in which the manner in which content is delivered to the wireless device is transparent to the sender.

SUMMARY OF THE INVENTION

The present invention provides unified messaging services which integrate voice messaging, email, and fax services into a single access point. A virtual private wireless network according to the present invention includes at least one wireless device having a screen for displaying received text and an intelligent information interconnect device integrating voice messaging, email, and fax services into a single access point.

The information interconnect device includes a centralized directory database storing identifying information regarding the wireless devices, and further storing delivery preference hierarchy information for delivering content to the wireless devices. A user interface is provided for specifying criteria used to select at least one device ID from the centralized database, and a message delivery system is provided for searching the centralized database using the specified criteria and transmitting information to the wireless device(s) using the delivery preference hierarchy information.

BRIEF DESCRIPTION OF THE DRAWINGS

FIG. 3C is an example of a communications group; and

FIG. 4 is a block diagram showing details of a first embodiment of the intelligent communications interconnect 104.

DETAILED DESCRIPTION OF THE PREFERRED EMBODIMENTS

Figure 1:
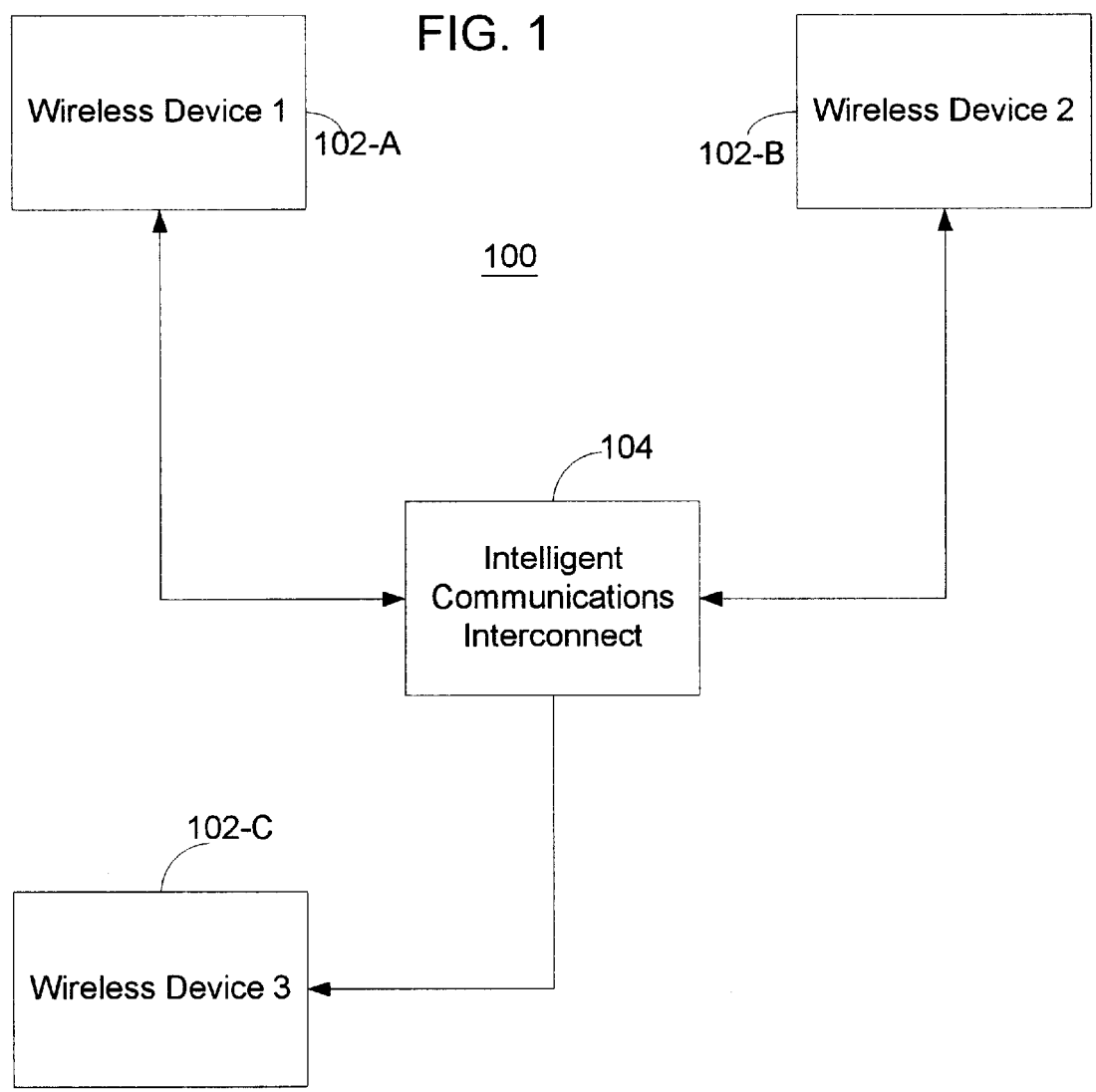
FIG. 1 is a block diagram providing an overview of the virtual private wireless network (VPWN) of the present invention.

FIG. 1 is a block diagram providing an overview of the virtual private wireless network (VPWN) of the present invention, generally designated 100. The VPWN 100 includes a plurality of wireless devices 102 and an intelligent communications interconnect 104. The VPWN supports communications with a wide variety of wireless devices 102 including but not limited to personal digital assistants (PDA's), one-way and two-way pagers, and cell phones including the latest generation of cell phones having wireless internet capabilities.

The VPWN 100 provides a platform for companies, affiliations, and enterprises to disseminate relevant information to their employees, customers, partners, and vendors. This is accomplished through a combination of push and pull technologies that interface traditional IT systems with disparate wireless devices. The VPWN 100 provides a secure platform for aggregating multiple customers on a common platform.

Figure 2:
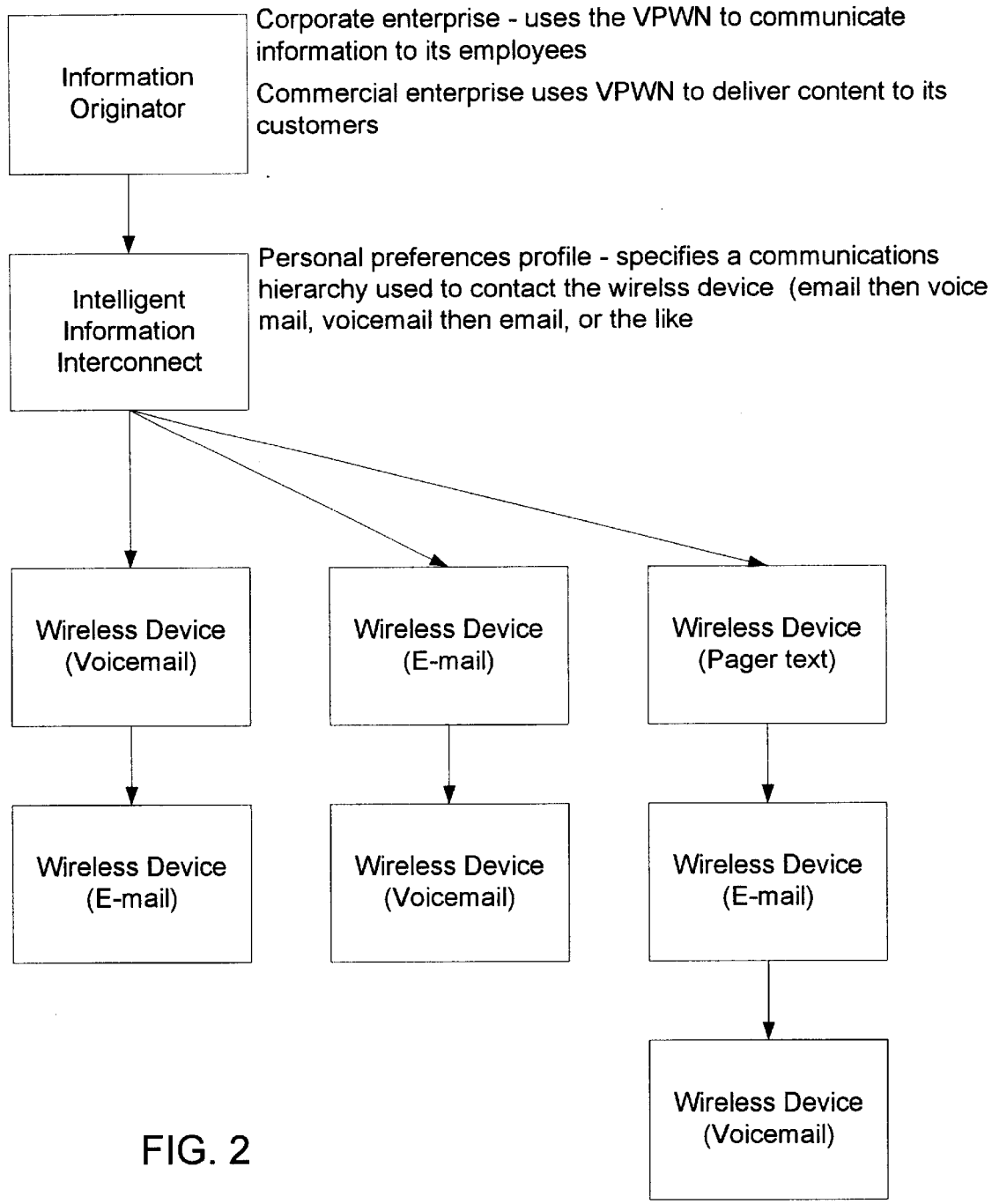
FIG. 2 is a block diagram showing how information is transmitted to wireless devices according to one aspect of the invention.

FIG. 2 is a block diagram showing how information is transmitted to wireless devices 102 according to one aspect of the invention.

As shown in FIG. 2, an information originator 108 communicates information to the wireless device(s) 102 via the intelligent information interconnect 104. According to one aspect of the present invention, the information originator 108 may broadcast a message to a group of wireless devices 102. As will be explained below, the interconnect 104 provides a way to define broadcast (interest) groups to facilitate broadcasting messages. A user defined preference profile 110 (FIG. 3A) contains information used by the interconnect 104 in determining how to deliver information to the device 102.

Figure 3A:
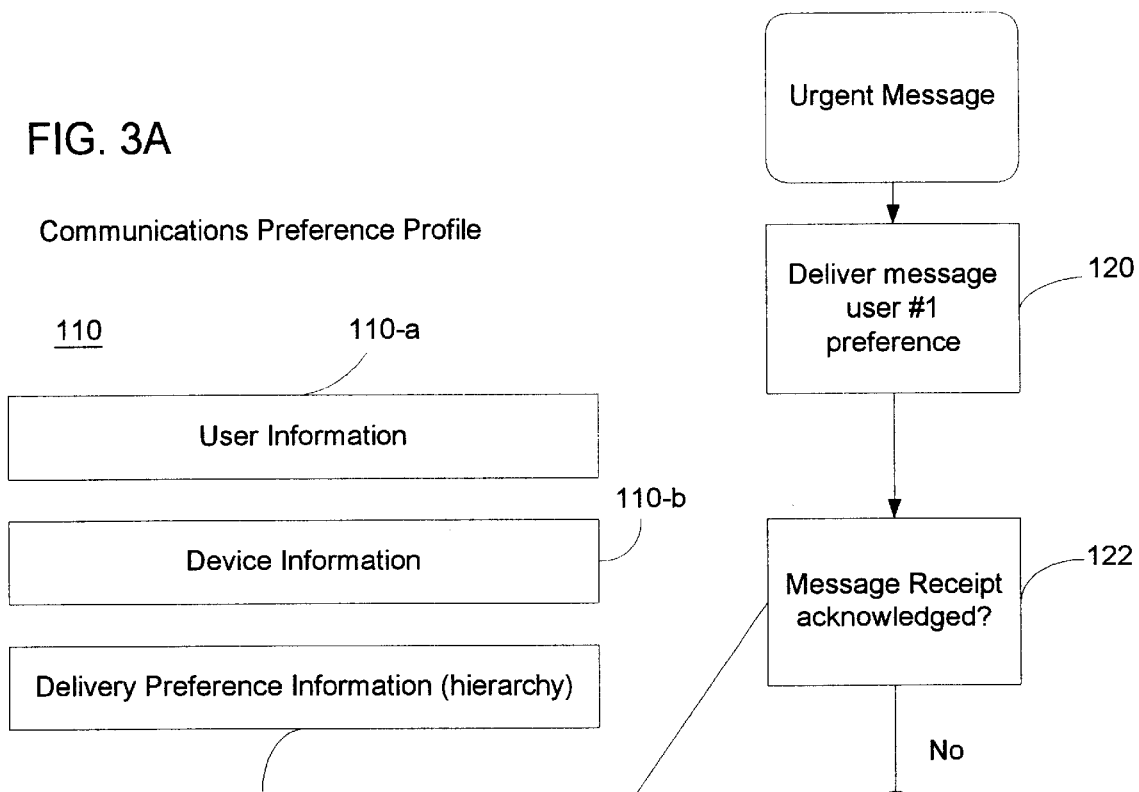
FIG. 3A is a table showing the fields included in a user preference profile.

As shown in FIG. 3A, the preference profile 110 contains user information 110-a, device information 110-b, and delivery preference information 110-c. The device information 110-b includes all device specific information necessary to communicate with the device, including email address, Internet Protocol address (IP address), telephone number, and communications protocol information. The delivery preference information 110-c defines the hierarchy used by the interconnect 104 in attempting to deliver messages.

Figure 3B:
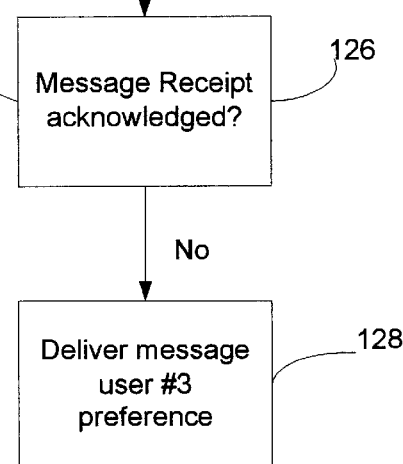
FIG. 3B is a flowchart showing the process for delivering an urgent message according to the hierarchy defined in the preference profile.

FIG. 3B is a flowchart showing the process for delivering an urgent message according to the delivery preference hierarchy defined in the preference profile 110. The interconnect 104 attempts to deliver information provided by the originator 108 according to a primary user preference (step 120). Next, the interconnect 104 verifies whether receipt of the message was acknowledged. If the message was acknowledged (step 122), then further processing is unnecessary (step 130). Otherwise, delivery of the message is attempted using the secondary user preference (step 124).

Once again the interconnect 104 verifies whether receipt of the message was acknowledged (step 126). If the message was acknowledged, then further processing is unnecessary (step 130). Otherwise, delivery of the message is attempted using the tertiary user preference (step 128).

The interconnect 104 determines receipt of the message was acknowledged using a variety of conventional methods which are well known in the art. For example, the system can determine whether an email has been read or a voice mail has been replayed. Likewise, two-way pagers transmit an acknowledgment message upon receipt of a message.

Referring once again to FIG. 2, the interconnect 104 first attempts to voicemail a message to user 102-a(1). If acknowledgement of the email is not received within a predefined period, the interconnect 104 attempts to email a message to user 102-a(2).

As will be described below, the interconnect 104 includes logic for translating information into a variety of communications formats. Thus, for example, the interconnect 104 may translate a text message into a voice message, or for converting an email into a page-compatible message format.

FIG. 4 is a block diagram showing details of the intelligent communications interconnect 104.

The communications interconnect 104 includes a user interface 200 used to enter information into, and request information from, the communications interconnect 104. An application server 210 coordinates the services provided by the various functional units of the communications interconnect 104, and includes a translation services module 212 used to translate content into a format compatible with the wireless device 102.

One of ordinary skill in the art will appreciate that there is not a single universal communications format compatible with all currently available wireless devices. The translation module 212 of the present invention performs its translation services in a manner which is transparent to the wireless device 102.

According to a preferred embodiment, the user interface 200 is a web page or the like accessible via a communications network 202 such as a local area network the Internet, or the like. Moreover, the user interface 200 may include a telephone menu system such as is known in the art.

Figure 3C:
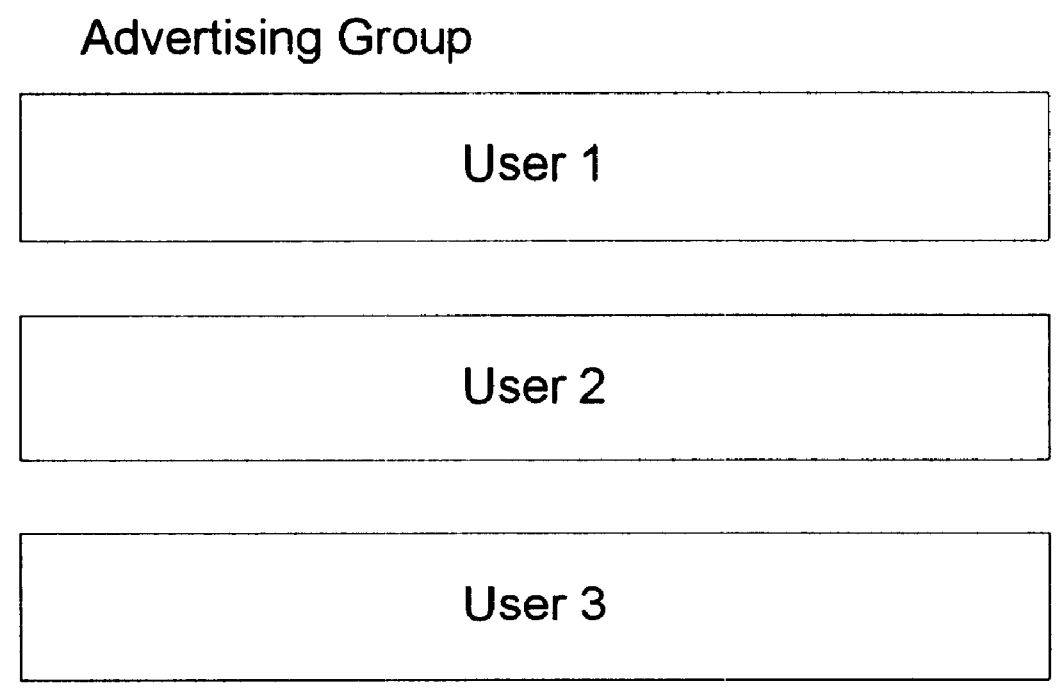

A preference management system 220 is used to define and maintain a user's communications preference profile 110, which is stored in a centralized directory database 222. In addition the preference management system is used to create user-defined broadcast groups (FIG. 3C)

The centralized directory database 222 provides multiple levels of administration for all types of organizations, and manages the associated permissions to manage data access across the organizations. Thus, for example, different administration level may be defined which enable a workgroup to manage user lists, broadcast messages, set delivery parameters and access levels of enterprise data on a pull basis.

According to a preferred embodiment, the directory database 222 is built using a Lightweight Directory Access Protocol (LDAP) which allows ad hoc extensions for managing additional permissions. Notably, LDAP is simply a database that allows additional attributes (fields) to be added to an existing database, on-the-fly, without having to redesign the database. According to a preferred embodiment, LDAP is implemented using Microsoft SQL 2000; however other LDAP implementations may also be used. The common directory supports a number of advanced services such as unified messaging and e-mail and phone "follow-me" roaming services.

More particularly, a message delivery mechanism (MDM) 230 (FIG. 4) performs the actual distribution of content to the wireless device 102. The MDM 230 accesses the directory database 222 via the preference management system 220 to determine a device information 110-b such as phone number (text-to-speech message delivery), IP address, or E-mail address. The MDM 230 attempts to deliver content using the delivery preference hierarchy defined in the preference management system 220 until it can insure that the message was received.

According to one aspect of the invention, the interconnect 104 provides unified messaging services which integrates voice messaging, email, and fax services into a single access point. The interconnect 104 provides a complete voice-messaging solution for the enterprise. Subscribers can retrieve, store, and record voice messages as well as edit, forward with comments, and reply to a subscriber's message with a phone call.

The VPWN 100 further provides Single Number Reach and Intelligent Notification Services which allow subscribers to be more responsive to their own customers. Single Number Reach is a user-configured feature by which a subscriber defines a cascade of phone numbers which the VPWN 100 will use in attempting to contact the subscriber.

For example, a subscriber may provide the VPWN with work (primary contact), cell phone (secondary contact), and home telephone numbers (tertiary contact). A user trying to call the VPWN subscriber will seamlessly be routed first to the primary contact, and then to the secondary and tertiary contacts in the order provided. Additionally, when a voice message is left for the user, the intelligent notification service will route a notification message through the content management system 232 to the message delivery mechanism 230 and to the user in the form of an SMS message or e-mail to alert them to the message waiting within the system.

The follow-me roaming services provided by the VPWN 100 allows end-users to direct content and call delivery to a pre-selected device or group of devices. The interface 200 enables a user to identify device(s) 102 to the interconnect 104, and specify the order in which the interconnect 104 looks for the device(s) in order to deliver the content.

Preferably, the preference profile created by the preference management system will include delivery preference information for content received from identified users or groups of users. In this manner, the preference management system enables a user to specify different delivery preferences for different message originators 108.

A combination of methods is used to determine if a message was received. If the message has not been read within a specific amount of time, the message is then attempted using the secondary or tertiary address. For example, an e-mail message may be sent as an HTML-type e-mail with an embedded dynamic link back to the VPWN message delivery server 230. If a request is made to this dynamic link, then the system 100 assumes that the HTML message was received.

A Content Management System (CMS) 232 provides a central point for the collection and dissemination of content within the VPWN 100, and manages data stored in the content database 234. Preferably, content is stored in database 234 in a device neutral format which is may be viewed using a browser or the like provided on the wireless device 102. If necessary, the translation services module 212 may translate (transcode, decode or clip) the content into a format compatible with the wireless device 102. Thus, the intelligent information interconnect device can receive data in a first delivery format from a message originator including information used to identify a given wireless device, and can deliver the received data to a wireless device in a second delivery format that is independent of the first delivery format.

The CMS 232 includes a rules engine (not illustrated) which gathers information from the Centralized Directory Database 222 in order to identify which user should have access to the various portions of the content stored in the database 234. More particularly the access parameters are established by the user within the Preference Management System 220 or by the corporate/enterprise administrators.

For example, a business enterprise may utilize the VPWN as a virtual intranet. Importantly, the VPWN 100 incorporates a wide variety of security features to minimize the threat of unauthorized access.

As shown in FIG. 4, the CMS 232 may (optionally) communicate with a third party content provider 236. The CMS 232 ensures that the correct content is delivered to, or made available to, the end-user 102 based upon information pulled from the directory database 222. Thus, for example, the preference management system could provide the user to subscribe to a variety of third-party content.

In addition, the CMS 232 incorporates a rule-based engine that can tailor content based upon various inputs, for example, partner, individual, content type, content source, content security levels. The rules based engine gathers information from the Centralized Directory 222 used to identify which users should have access to particular content (pull) in the Content Database 234, and which content should be sent (pushed) to particular users using parameters that are established by the user within the Preference Management System 220 or by the corporate/enterprise administrators 200. From Referring once again to FIG. 2, the information originator 108 may be a corporate enterprise which uses the VPWN to communicate to its employees. According to this example, the corporate enterprise would administer the content it desires to deliver using the content management system 232 which it accesses via the interface 200. Content is stored in a content database 234. Moreover, content may be provided by third party content providers 236 and disseminated via the MDM 230 according to (interest) group information maintained by the CMS 232 and delivery preference information maintained by the preference management system 220.

Optionally, the VPWN may be integrated with a Web-Based Storefront 200-2 used to sell wireless devices.

According to the embodiment depicted in FIG. 4, the VPWN provides value added services to storefront 200-2. For example, the storefront 200-2 may utilize the database 222 to store customer information.

In the embodiment shown in FIG. 4, the VPWN includes a Customer Service Module 300 which allows customer service representatives to maintain information on all aspects of a customer's wireless devices. This is accomplished through the directory database 222 and/or a customer service database 310.

The Customer Service Database 310 maintains user and enterprise level information. It allows customer service representatives to provide first level support by having access to user profile information such as enterprise affiliation, specific wireless device information (SN, model number, applications), wireless service information (calling/service plan, plan rates, network coverage), workgroup information (security levels, group assignments, group administrator contact information).

An order fulfillment system 320 may be provided for gathering customer data, validating a customer order, and ultimately performing the necessary technical and manual transactions to complete the setup of the wireless devices purchased from the Web-Based Storefront 200-2. The order fulfillment system 320 stores customer order data in an order fulfillment database 330.

An optional procurement management system 340 enables an organization to manage a variety of wireless devices using a common platform. More particularly, the procurement management system 340 enables an organization to track total cost of ownership, allowing an organization to carefully manage their device inventory. This information feeds back into the common directory 222 to insure that the VPWN 100 always has the most current IP address, phone number, and e-mail address for any individual's current devices 102.

While various embodiments of the present invention have been shown and described, it should be understood that other modifications, substitutions and alternatives can be made without departing from the spirit and scope of the invention, which should be determined from the appended claims.

What is claimed is:

1. A virtual private wireless network, comprising:
   at least one wireless device having a screen for displaying received text;
   an intelligent information interconnect device integrating voice messaging, email, and fax services into a single access point;
   a centralized directory database storing identifying information regarding said wireless device, and storing a delivery preference hierarchy information for delivering content to said wireless device;
   a user interface for specifying criteria used to select at least one device ID from said centralized database;
   a message delivery system, searching said centralized database using said criteria to determine at least one device ID, and transmitting information to said wireless device(s) corresponding to said selected device ID using said delivery preference hierarchy information; and
   a translation services module which translates a format of said content to a format compatible with a selected wireless device, said translation services module performing one or more operations on said content selected from the group of clipping, transcoding, and decoding prior to transmitting said content to said wireless device in accordance with device information stored in said centralized directory database.

2. The virtual private wireless network according to claim 1, wherein said user interface is a web page accessible via a communications network.

3. The virtual private wireless network according to claim 2, wherein only a predetermined subset of said centralized directory database is accessible to a given user, and said message delivery system searches said predetermined subset to select said device ID.

4. The virtual private wireless network according to claim 1, wherein said user interface is a menu structure compatible with a touch tone phone.

5. The virtual private wireless network according to claim 1, further comprising:
   a content database storing said content as content; and
   a content management system managing content data stored in said content database, and providing selected said content data to said message delivery system;
   said content management system further managing content subscription lists for each of said wireless devices;
   said content management system selectively providing content to said message delivery system in response to one of a request from said user interface and subscription information contained in said content subscription lists.

6. The virtual private wireless network according to claim 1, wherein said intelligent information interconnect device receives data in a first delivery format from a message originator including identification information used to identify a given said wireless device, and delivers said received data to said wireless device in a second delivery format, wherein said second delivery format is independent of said first delivery format.

7. The virtual private wireless network of claim 1, wherein said translation services module performs clipping, transcoding and decoding.

8. The virtual private wireless network of claim 1, wherein said one wireless device is capable of receiving messages in a variety of content formats, and wherein said delivery preference hierarchy information includes a user's preference relating to an order of content format types that is used to send messages to said one wireless device.

9. The virtual private wireless network of claim 1, further comprising a plurality of wireless devices providing a plurality of content formats, and wherein said delivery preference hierarchy information indicates the order in which said wireless devices of said plurality of wireless devices are to be sent messages determined by a user selected order of content formats.

10. A virtual wireless network, comprising:
   a plurality of wireless devices;
   an application server;
   a user interface accessible to said plurality of wireless devices for entering information into said application server;
   a directory database accessible to said application server, said directory database storing user information, device information for each said user, and delivery preference hierarchy information for each said user;
   a content database storing content;
   a content management system for managing content stored in said content database, said content management system being responsive to requests entered in said user interface; and
   a translation services module which translates a format of said content to a format compatible with a selected wireless device, said translation services module performing one or more operations on said content selected from the group of clipping, transcoding, and decoding prior to transmitting said content to said wireless device in accordance with said device information stored in said directory database.

11. The virtual wireless network according to claim 10, comprising a security system providing access to said application server only to wireless devices defined in said directory database.

12. The virtual wireless network according to claim 10, wherein
   a delivery format of content received for delivery to said wireless devices is independent of a delivery format in which said content is provided to said wireless devices.

13. The virtual private wireless network of claim 10, wherein said translation services module performs clipping, transcoding and decoding.

14. The virtual wireless network of claim 10, wherein said selected wireless device is capable of receiving messages in a variety of content formats, and wherein said delivery preference hierarchy information includes the user's preference relating to an order of content format types that is used to send messages to said selected wireless device.

15. The virtual wireless network of claim 10, wherein said plurality of wireless devices provides a plurality of content formats, and wherein said delivery preference hierarchy information indicates the order in which said wireless devices of said plurality of wireless devices are to be sent messages determined by a user selected order of content formats.

16. A virtual network for wireless devices, comprising:
   an application server having an interface for entering wireless device information and delivery preference hierarchy information specifying at least one content format used to deliver content to the wireless device;
   a directory database storing said wireless device information and said delivery preference hierarchy information entered into said application server interface;
   said application server receiving content from a message originator, identifying the wireless device(s) to which said received content is directed, and delivering said received content to the wireless devices in accordance with said delivery preference information for each wireless device;
   a content database storing content;
   a content management system for managing content stored in said content database, said content management system being responsive to requests entered in said user interface; and
   a translation services module which translates a format of said content to a format compatible with a selected wireless device, said translation services module performing one or more operations on said content selected from the group of clipping, transcoding, and decoding prior to transmitting said content to said wireless device in accordance with said wireless device information stored in said directory database.

17. The virtual private wireless network of claim 16, wherein said translation services module performs clipping, transcoding and decoding.

18. The virtual network of claim 16, wherein said selected wireless device is capable of receiving messages in a variety of content formats, and wherein said delivery preference hierarchy information includes a user's preference relating to an order of content format types that is used to send messages to said selected wireless device.

19. The virtual network of claim 16, further comprising a plurality of wireless devices providing a plurality of content formats, and wherein a user's delivery preference hierarchy information indicates the order in which said wireless devices of said plurality of wireless devices are to be sent messages determined by a user selected order of content formats.

* * * * *